UNITED STATES PATENT OFFICE.

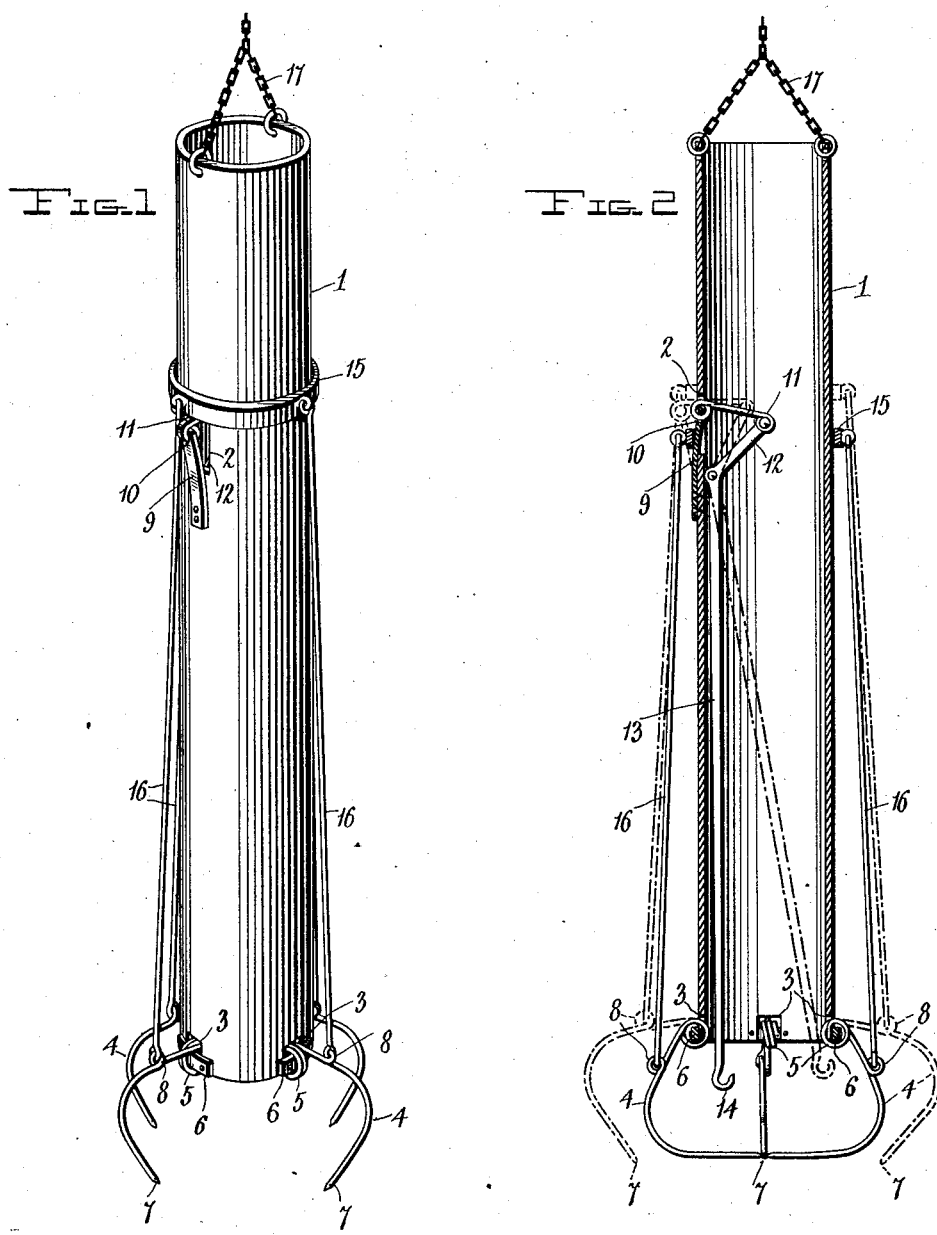

JOHN EMEL, SR., OF SILVERDALE, WASHINGTON.

TRAP.

1,010,605.  Specification of Letters Patent.  Patented Dec. 5, 1911.

Application filed August 2, 1911. Serial No. 641,993.

*To all whom it may concern:*

Be it known that I, JOHN EMEL, Sr., a citizen of the United States, residing at Silverdale, in the county of Kitsap, State of Washington, have invented certain new and useful Improvements in Traps; and I do hereby declare the following to be a full, clear, and exact description of the invention, such as will enable others skilled in the art to which it appertains to make and use the same.

My invention relates to new and useful improvements in traps, and more especially to that type known as jaw traps having a plurality of spring closed hook shaped jaws adapted to close upon and pass into the animal to be caught, and the object of my invention is to improve the construction and increase the efficiency of traps of the above described character. And a further object of my invention is to provide an improved trip mechanism for use with traps of the above described character.

With these and other objects in view, my invention will be more fully described, illustrated in the drawings which show a preferred embodiment of my trap and then specifically pointed out in the claims which are attached to and form a part of this application.

In the accompanying drawings, Figure 1 is a perspective of the trap in open position. Fig. 2 is a central longitudinal section, the dotted lines showing the position of the parts when the trap is set.

Referring more specifically to the drawings, in which similar reference numerals designate corresponding parts throughout, 1 designates the body of the trap which as shown consists of a hollow cylindrical member, preferably formed of metal, and provided intermediate its length with a longitudinal slot 2, the purpose of which will be hereinafter explained. One end of this body portion is provided with a plurality of upwardly extending slots 3 in each of which is mounted a spring jaw, which as a whole, is designated by the numeral 4. As seen each of these jaws consists of a coil spring 5 the inner end of which is secured to a metal strip 6 which extends across the slot 3 in such a manner that the spring is positioned in the slot and the jaw thereby held from side movement. This spring 5 terminates in the hook shaped jaw member proper 7 which is provided intermediate its length with an outwardly extending perforated ear 8, the purpose of which will be hereinafter explained.

Secured to the body member 1 and immediately below the slot 2 is a leaf spring 9 the free end of which extends over and is adapted to pass into the slot 2. This end of the spring is provided with a transversely extending slot 10 by means of which a trigger 11 is attached thereto, the free end of the trigger being passed through the slot and pivotally connected to the free end of the arm 12, which arm intermediate its length is pivoted to the inner face of the body member. This arm 12 as shown is bent at an angle to form a downwardly extending member or rod 13 which passes downwardly through the body portion of the trap and terminates immediately below the lower end of the same in a bait receiving hook 14. As shown the normal tendency of the spring 9 is to maintain the trigger 11 in an extended position through the side of the body member.

Surrounding the body member 1 and slidable thereon is a ring 15 pivoted to which are a plurality of downwardly extending rods 16, the lower ends of which are pivotally secured to the jaws 7 by means of perforated ears 8. Secured to the upper end of the body member is a chain 17 by which the trap may be secured when in use.

In operation suitable bait is secured upon the hook 14 and the collar or ring is then slipped up over the body of the trap forcing the spring held trigger through the slot 2 until the ring has passed above the trigger. At this point the trigger is drawn back through the slot by the action of the spring and thus serves to prevent the return of the ring. As will be readily understood the raising of the ring as above described opens the jaws of the trap against the tension of the coil springs 5. The slightest pull exerted upon the hook 14, as will be readily understood, immediately draws the trigger through the slot 2 and releases the ring, allowing the latter to slide down over the body of the trap as the jaws close.

As will be readily seen the trap above described is simple and economical in construction, consisting of but few parts, and at the same time extremely effective in operation.

What I claim is:—

1. An animal trap, comprising a hollow cylindrical body member provided intermediate its length with a longitudinal slot, a spring held trigger mounted in said slot and adapted to normally extend therethrough, a rod extending from said trigger within said body portion and terminating in a bait receiving hook immediately below one end of the same, a plurality of spring closed jaws secured to said end of the body member, a ring slidably mounted upon said body member and adapted to be engaged by said trigger when in one position and a plurality of rods pivotally connecting said jaws to said ring.

2. An animal trap, comprising a hollow cylindrical body member provided intermediate its length with a longitudinal slot, a spring held trigger mounted in said slot and adapted to normally extend therethrough, a trip mechanism operatively connected to said trigger, said member being further provided at one end with a plurality of inwardly extending slots, a plurality of hook-shaped jaws positioned one in each of said slots, each jaw including a coil spring adapted to normally maintain the jaws in closed position, a ring slidably mounted on said body member and adapted to be engaged by the trigger when in raised position, and a plurality of connecting members joining said ring and jaws whereby the jaws are held in extended position when the ring is engaged by the trigger.

In testimony whereof, I affix my signature, in presence of two witnesses.

JOHN EMEL, Sr.

Witnesses:
A. L. THARP,
WM. H. BYRON.

---

Copies of this patent may be obtained for five cents each, by addressing the "Commissioner of Patents, Washington, D. C."